United States Patent [19]

Allart et al.

[11] 4,124,526

[45] Nov. 7, 1978

[54] ENCAPSULATION PROCESS AND RESULTING AQUEOUS DISPERSION OF ENCAPSULATED DROPLETS

[75] Inventors: Pierre J. Allart, Brussels; Henri B. May, Overijse, both of Belgium

[73] Assignee: Monsanto Company, St. Louis, Mo.

[21] Appl. No.: 806,219

[22] Filed: Jun. 13, 1977

[30] Foreign Application Priority Data

Jun. 16, 1976 [GB] United Kingdom ............... 24971/76

[51] Int. Cl.² ............................................. B01J 13/02
[52] U.S. Cl. .................................. 252/316; 282/27.5; 424/33; 428/307; 428/914
[58] Field of Search ........................... 252/316; 424/33

[56] References Cited

U.S. PATENT DOCUMENTS

| 3,190,837 | 6/1965 | Brynko et al. | 252/316 |
| 3,244,640 | 4/1966 | Studt et al. | 252/316 |
| 3,341,466 | 9/1967 | Brynko et al. | 252/316 |
| 3,725,501 | 4/1973 | Hilbelink et al. | 252/316 X |

*Primary Examiner*—Richard D. Lovering
*Attorney, Agent, or Firm*—Herman O. Bauermeister; William H. Duffey

[57] ABSTRACT

Oil droplets are encapsulated by forming a dispersion of the droplets in an aqueous alkaline liquid medium containing a water-soluble salt of a polycarboxylate polymer and acidifying the medium to a pH in the range of 5 to 8 whereby the polycarboxylate polymer precipitates to form walls around the droplets.

9 Claims, No Drawings

ENCAPSULATION PROCESS AND RESULTING AQUEOUS DISPERSION OF ENCAPSULATED DROPLETS

BACKGROUND OF THE INVENTION

1. Field of the Invention

This invention relates to a process for the encapsulation of minute droplets of water-insoluble liquids (hereinafter referred to as oils).

2. Description of the Prior Art

Microcapsules containing both liquid and solid nucleus materials have found widespread acceptance in a variety of commercial applications. For example, one of the most widespread uses has been in the art of transfer-copy systems wherein minute droplets of a colourless dye intermediate dispersed or dissolved in an oil are encapsulated and coated onto a transfer sheet. The dye intermediarte is thereafter transferred to a copy sheet by rupturing the capsules by the application of a marking instrument. The underlying copy sheet has an adsorbent coating containing a material which will react with the dye intermediate causing a visible coloured mark at points where the microcapsules have been ruptured and the dye transferred. Other recent applications in which microcapsules have been used extensively are in adhesives and adhesive tapes, fertilizers, pharmaceuticals, foods and cosmetics.

Various techniques for the encapsulation of oil droplets have been proposed. U.S. Pat. No. 4,001,140 exemplifies recent technology in this art. Probably the most widely employed encapsulating material is gelatin, and the process by which it is utilised involves the phenomenon known as coacervation, which is exhibited by gelatin and certain other natural and synthetic polymeric materials which form colloidal solutions in water.

One of the disadvantages of the coacervation encapsulation techniques is that critical control over the concentrations of the colloidal material and the coacervation initiator must be maintained. In addition, when a gelable colloid such as gelatin, is used as the encapsulating material, coacervation must take place at a temperature above the gel point of the colloid.

The process of the present invention does not involve the coacervation phenomenon, the disadvantages of which are therefore avoided.

SUMMARY OF THE INVENTION

The process of the present invention comprises forming a dispersion of droplets of an oil in an aqueous alkaline liquid medium containing in solution a water-soluble salt of a polycarboxylate polymer having the structure of an ethylene/maleic acid copolymer wherein a proportion of the carboxylic acid groups are replaced by carboxylic amide groups, (hereinafter referred to as the encapsulating polymer), and acidifying the aqueous liquid medium to a pH in the range 5 to 8 while maintaining the droplets in dispersion, whereby encapsulating polymer is precipitated to form walls around the droplets.

The invention also includes a pressure-sensitive transfer sheet record material comprising a coating of microcapsules produced by the process of the invention applied to one side of a sheet of paper, the said microcapsules containing a colourless, leuco dye intermediate dispersed or dissolved in an oil.

Preferred amide groups in the polycarboxylate polymer are secondary amide groups, especially secondary amide groups having the formula —CONHR, where R represents an aliphatic or cycloaliphatic group, for example an alkyl or alkenyl group of up to 6 carbon atoms, for instance ethyl, n-propyl, isopropyl, n-butyl, t-butyl, n-amyl, s-amyl or allyl, or a cycloalkyl group of 5 or 6 ring carbon atoms and a total of up to 10 carbon atoms, for example cyclopentyl, cyclohexyl or methylcyclohexyl. R may also be a group derived from a polyamine of the formula:

where R is hydrogen or methyl and n is an integer from 1 to 4, or from a diamine of the formula:

where m is an integer from 2 to 8.

Examples of oils that can be encapsulated by the process of the invention include mineral oils such as lubricating oils, kerosene, naphtha and paraffin oils, and vegetable oils such as corn oil, linseed oil and castor oil. Oils that are particularly useful as solvents for dye-precursors in the manufacture of carbonless copying paper are various synthetic hydrocarbon oils, for example partially hydrogenated terphenyls, i.e. various mixtures of terphenyls with hexahydroterphenyls and dodecahydroterphenyls, alkylated naphthalenes and alkylated biphenyls such as isopropylnaphthalenes, n-hexylnaphthalenes and n-amylbiphenyls, and alkylated diphenylalkanes, for instance benzylated toluenes and benzylated ethylbenzenes. Mixtures of these synthetic hydrocarbon oils with, for example, mineral oils or vegetable oils, can be used as solvents for dye-precursors.

In the aqueous alkaline medium in which the oil droplets are dispersed, a sufficiently high proportion of the carboxylic acid groups of the encapsulating polymer exist as carboxylate anions to render the polymer water-soluble, while during acidification of the aqueous medium, carboxylate anions are converted to carboxylic acid groups. It is believed that acidification of the aqueous medium to a pH in the range 5 to 8 does not result in a complete conversion, but that carboxylate ions may still exist in the wall polymer, especially adjacent to the oil droplet. The aqueous medium is preferably acidified to a pH in the range 5 to 6; preferably using an acid having a dissociation constant not greater than $2 \times 10^{-3}$ in aqueous solution at 25° C. The acid is usually added as an aqueous solution.

Encapsulating polymers for use in the present invention can be prepared by the partial amidation of an ethylene/maleic acid copolymer, by the partial hydrolysis of an ethylene/maleamide copolymer or by the copolymerisation of the required proportions of ethylene, maleic acid and maleic amide monomers.

The process of the invention can be carried out by dissolving an encapsulating polymer in an aqueous alkaline medium wherein the alkalinity is preferably provided by the presence of an alkali metal hydroxide, for example sodium hydroxide, or alternatively, and in some instances more conveniently, a solution of a water-soluble salt of an encapsulating polymer can be formed in situ from a precursor or precursors.

For example, in a preferred process for the preparation of an encapsulating polymer, an ethylene/maleic anhydrice copolymer is added to a solution of an amine in dilute sodium hydroxide solution, which results in the formation of a solution of the sodium salt of the maleic acid half-amide. More generally, the aqueous alkaline liquid medium containing a water-soluble salt of a polycarboxylate polymer is prepared by contacting an ethylene/maleic anhydride copolymer, preferably an ethylene/maleic anhydride copolymer having a molecular weight of from 20,000 to 70,000, for example from 20,000 to 30,000 or from 60,000 to 70,000, with an aqueous solution of an alkali metal hydroxide and an amine under conditions such that opening of the anhydride rings occurs with the formation of pendant alkali metal carboxylate and carboxylic amide groups.

The alkali metal hydroxide and the amine are preferably used in substantially equivalent amounts such that the opening of the anhydride rings results in the formation therefrom of one alkali metal carboxylate group and one carboxylic amido group per ring. Some variations from equivalent amounts of the two reactants are possible, however. For example the alkali metal hydroxide and aliphatic amine may be used in a molar ratio of hydroxide to amine of from 3:5 to 5:3, giving an encapsulating polymer containing relatively more alkali metal carboxylate groups than carboxylic amide groups or vice versa.

The combined quantities of alkali metal hydroxide and amine used are preferably substantially the stoichiometric equivalent of the anhydride groups of the ethylene/maleic anhydride copolymer, but a small deficiency or excess such that the combined quantity may be, for example, from 80 to 120% of the stoichiometric amount, has only a minor effect on the process.

Amines used in the preferred process for the derivation of the amide groups —CONHR are aliphatic and cycloaliphatic primary amines of the formula $RNH_2$ where R is defined above, including, for example, n-propylamine, n-butylamine, n-pentylamine, as well as the specified polyamines which include, for instance, diethylene triamine, tetraethylene pentamine and dipropylene triamine, and the specified diamines which include, for instance, ethylene diamine and tetramethylene diamine.

The relative amounts of oil and encapsulating polymer in the process of the invention can vary over a considerable range. It will be understood that, at constant oil droplet size, increasing the proportion of oil relative to the polymer will result in thinner capsule walls. Reducing the proportion will result, up to a point, in the production of thicker-walled capsules, but then, as the relative amount of polymer increases, there may be formed a system in which capsules, aggregates of capsules, or oil droplets are embedded in a polymer matrix. The optimum proportion of oil to polymer will vary, depending on what capsule wall strength is most suitable for the application for which the capsules are produced.

The "solids" content, i.e. the concentration of oil plus encapsulating polymer in the dispersion, can also vary over a considerable range. For economic reasons, it is generally preferred to have as high a solids content as possible consistent with suitability for use of the dispersion. By the process of the present invention, dispersions having solids contents of up to 35% by weight can be produced, for example.

The encapsulation process is most conveniently carried out at ordinary room temperature. The acidification is slightly exothermic, and when operating on a large scale or with heat-sensitive materials, provision for cooling of the reaction mixture may be desirable.

If desired, the encapsulating polymer forming the capsule walls can be hardened by treatment with a cross-linking agent. Suitable cross-linking agents include substances containing at least two methylol groups per molecule, for example dimethylolurea, trimethylolmelamine, and oligomeric urea-formaldehyde, melamine-formaldehyde or phenol-formaldehyde condensates. Cross-linking can be effected by heating an aqueous dispersion of encapsulated oil droplets to which the cross-linking agent has been added, usually at a temperature not exceeding 80° C., for example at 60° to 70° C., for from 1 to 3 hours.

When the process of the invention is applied to the production of transfer copy systems, the oil that is encapsulated is a solution of a dye precursor or chromogen. A chromogen is a substantially colourless organic compound which is converted to a coloured form on contact with a sensitizing agent. A preferred class of chromogens for use with the encapsulating polymers described herein includes compounds of the phthalide type such as crystal violet lactone which is 3,3-bis(p-dimethylaminophenyl)-6-dimethylaminophthalide, and malachite green lactone which is 3,3-bis-(p-dimethylaminophenyl)phthalide. Other phthalide-derived chromogenic materials include 3,3-bis-(p-m-dipropylaminophenyl)phthalide, 3,3-bis(p-methylaminophenyl)phthalide, 3-(phenyl)-3-(indole-3-yl)-phthalides such as 3-(p-dimethylaminophenyl)-3-(1,2-dimethyl-indol-3-yl)phthalide, 3,3-bis-(phenylindol-3-yl)phthalides such as 3,3-bis(1,2-dimethylindol-3-yl)phthalide, 3-(phenyl)-3-(heterocyclic-substituted)phthalides such as 3-(p-dimethylaminophenyl)-3-(1-methylpyrr-2-yl)-6-dimethylaminophthalide, indole- and carbazole-substituted phthalides such as 3,3-bis(1,2-dimethylindol-3-yl)-5-bis(1,2-dimethylindol-3-yl)-5-dimethylaminophthalide and 3,3-bis(9-ethylcarbazol-3-yl)-5-dimethylaminophthalide, and substituted indole phthalides such as 3-(1,2-dimethylindol-3-yl)-3-(2-methylindol-3-yl)-phthalide.

Other chromogenic dye compounds also useful in the practice of this invention include indole-substituted pyromellitides such as 3,5-bis(p-diethylaminophenyl)-3,5-bis-(1,2-dimethylindol-3-yl)pyromellitide, 3,7-bis(p-diethylaminophenyl)-3,7-bis(1,2-dimethylindol-3-yl)pyromellitide, 3,3,7,7-tetrakis-(1,2-dimethylindol-3-yl)pyromellitide and 3,3,5,5-tetrakis-(1,2-dimethylindol-3-yl)pyromellitide; and leucauramines and substituted leucauramines such as p-xylyl-leucauramine and phenyl-leucauramine. Also included are orthohydroxybenzoacetophenone, 2,4-bis[p-(p-dimethylaminophenylazo)-anilino]-6-hydroxy-symtriazine, N,3,3-trimethylindolinobenzospiropyrans, and N,3,3-trimethylindolino-β-naphthospiro-pyrans.

An auxiliary colouring agent can be employed with the above chromogens to provide fade resistance where fading is a problem. Many phthalide compounds such as crystal violet lactone for example, are characterized by rapid colour development with a normal tendency to fade during the course of time. One suitable auxiliary colouring agent is benzoyl leuco methylene blue which oxidizes when released on the paper to slowly form a permanent blue colour. The combination of a phthalide chromogen and such a colourless oxidizable auxiliary colouring agent provides a composition having both rapid colour development and fade resistance.

The invention is illustrated by the following Examples.

EXAMPLE 1

15 Grams of an ethylene-maleic anhydride copolymer were added with stirring to 91.3 grams of a 5.2% by weight solution of sodium hydroxide in water at room temperature, followed by 8.7 grams of n-butylamine. These quantities provide 1 molecule of sodium hydroxide and 1 molecule of n-butylamine per anhydride group of the polymer. The copolymer dissolved to form a clear syrupy solution which was then stirred with a high speed agitator while 50 grams of a 3% by weight solution of crystal violet lactone in an oil consisting of partially hydrogenated terphenyls was added slowly. Emulsification of the oil solution occurred readily. The high speed agitator was replaced by a slowly rotating paddle stirrer, and acid was added slowly until the pH had fallen to about 5. Microscopic examination of the sample of the emulsion at this time showed the oil droplets coated with a distinct wall of polymer material.

A coating of the emulsion was applied by brushing to one side of a sheet of paper.

The coating dried to give a colourless layer. The paper was superimposed, coated side downwards on a clay-coated receiver sheet. Pen and type markings made on the top sheet were reproduced quickly and clearly on the receiver sheet.

The coating was moreover found to have good resistance to frictional smudge.

EXAMPLE 2

7.5 Grams of an ethylene/maleic anhydride copolymer having a molecular weight of 20,000 to 30,000 were added with stirring to a solution of 4.3 grams of n-butylamine and 2.4 grams of sodium hydroxide in 100 grams of water at room temperature.

The copolymer dissolved to form a clear solution which was then stirred with a high speed agitator while 100 grams of a 3% by weight solution of crystal violet lactone in an oil consisting of 2 parts by weight of partially hydrogenated terphenyls and 1 part by weight of kerosene was added slowly. Emulsification of the oil solution occurred readily. The high speed agitator was replaced by a slowly rotating paddle stirrer, and a 10% by weight aqueous acetic acid solution was added slowly until the pH had fallen to about 5. Five grams of a 60% by weight solution of methylolated melamine were then added and, with continued stirring, the emulsion was heated to, and held at, 65° C. for 2 hours. Microscopic examination of the sample of the emulsion at this time showed the oil droplets coated with a distinct wall of polymer material.

A coating of the emulsion was applied by brushing to one side of a sheet of paper, and dried to give a colourless layer. The paper was superimposed, coated side downwards, on a clay-coated receiver sheet. Pen and type markings made on the top sheet were reproduced quickly and clearly on the receiver sheet.

The embodiments of the invention in which an exclusive property or privilege is claimed are defined as follows:

1. A process for the encapsulation of oil droplets which comprises the steps of:
    (a) Forming a dispersion of droplets of the oil in an aqueous alkaline liquid medium containing in solution an alkali metal salt of a polycarboxylate polymer; said alkali metal salt having been prepared by contacting an ethylene/maleic anhydride copolymer with an aqueous solution of an alkali metal hydroxide and an alkylamine or alkenylamine of up to 6 carbon atoms, a cycloalkylamine having 5 or 6 ring carbon atoms, a polyamine of the formula $$H_2N(CHRCH_2NH)_nCHRCH_2NH_2$$

where R is hydrogen or methyl and $n$ is an integer from 1 to 4;
    or a diamine of the formula $$H_2N(CH_2)_mNH_2$$

where $m$ is an integer from 2 to 8;
    using a molar ratio of hydroxide to amine of from 3:5 to 5:3 and a combined quantity of hydroxide and amine which is from 80 to 120% of the stoichiometric quantity required for opening of the anhydride rings of the ethylene/maleic anhydride copolymer to form pendant alkali metal carboxylate and carboxylic amide groups; and
    (b) Acidifying the aqueous liquid medium to a pH in the range 5 to 8 while maintaining the droplets in dispersion, whereby polycarboxylate polymer is precipitated to form walls around the droplets.

2. A process of claim 1 in which the aqueous liquid medium is acidified to a pH in the range of 5 to 6.

3. A process of claim 1 in which the alkali metal salt of the polycarboxylate polymer is the sodium salt.

4. A process of claim 3 in which the amine is an aliphatic or cycloaliphatic amine.

5. A process of claim 4 in which the amine is n-propylamine, n-butylamine, n-pentylamine or diethylene triamine.

6. A process of claim 1 in which the ethylene/maleic anhydride copolymer has a molecular weight within the range 20,000 to 70,000.

7. A process of claim 1 in which the acid used to acidify the aqueous liquid medium is an acid having a dissociation constant not greater than $2 \times 10^{-3}$ in aqueous solution at 25° C.

8. A process of claim 7 in which the acid is acetic acid.

9. An aqueous dispersion of encapsulated oil droplets that has been obtained by a process of claim 1.

* * * * *

UNITED STATES PATENT AND TRADEMARK OFFICE
CERTIFICATE OF CORRECTION

PATENT NO.  : 4,124,526
DATED       : November 7, 1978
INVENTOR(S) : Pierre J. Allart et al.

It is certified that error appears in the above-identified patent and that said Letters Patent are hereby corrected as shown below:

On cover page of patent, after [73], "Assignee: Monsanto Company, St. Louis, Mo." should be changed to -- Assignee: Monsanto Europe S.A., Brussels, Belgium --

*Signed and Sealed this*

*Twenty-ninth* Day of *May 1979*

[SEAL]

Attest:

RUTH C. MASON
*Attesting Officer*

DONALD W. BANNER
*Commissioner of Patents and Trademarks*